(12) United States Patent
Dimitroff

(10) Patent No.: US 12,390,774 B1
(45) Date of Patent: Aug. 19, 2025

(54) ROTATING VACUUM TANK AND METHOD

(71) Applicant: Ted R. Dimitroff, Columbia, MO (US)

(72) Inventor: Ted R. Dimitroff, Columbia, MO (US)

( * ) Notice: Subject to any disclaimer, the term of this patent is extended or adjusted under 35 U.S.C. 154(b) by 0 days.

(21) Appl. No.: 18/981,963

(22) Filed: Dec. 16, 2024

Related U.S. Application Data

(63) Continuation of application No. 18/581,854, filed on Feb. 20, 2024, now Pat. No. 12,201,953.

(51) Int. Cl.
| | |
|---|---|
| B01F 29/00 | (2022.01) |
| A47L 7/00 | (2006.01) |
| A47L 9/24 | (2006.01) |
| B01F 23/53 | (2022.01) |
| B01F 29/60 | (2022.01) |
| B01F 35/71 | (2022.01) |
| B01F 35/75 | (2022.01) |
| B08B 5/04 | (2006.01) |
| B09B 3/38 | (2022.01) |
| B01F 33/502 | (2022.01) |

(52) U.S. Cl.
CPC ............ *B01F 29/60* (2022.01); *A47L 7/0038* (2013.01); *A47L 9/242* (2013.01); *B01F 23/53* (2022.01); *B01F 35/718* (2022.01); *B01F 35/7543* (2022.01); *B08B 5/04* (2013.01); *B09B 3/38* (2022.01); *B01F 33/5021* (2022.01)

(58) Field of Classification Search
CPC .... B01F 29/60; B01F 33/5021; B01F 33/502; B01F 35/7543; B01F 35/718; B28C 5/422; A47L 7/0004; B09B 3/38; B08B 5/04

See application file for complete search history.

(56) References Cited

U.S. PATENT DOCUMENTS

| | | | | |
|---|---|---|---|---|
| 3,617,031 A | * | 11/1971 | Paris ..................... | B28C 7/0481 366/18 |
| 4,792,234 A | * | 12/1988 | Doherty ............... | B28C 9/0454 366/14 |
| 5,918,975 A | | 7/1999 | Hotchkiss | |
| 2004/0208079 A1 | * | 10/2004 | Hein ....................... | B01F 29/60 106/713 |
| 2006/0250889 A1 | | 11/2006 | Wakefield | |
| 2015/0078417 A1 | * | 3/2015 | Verdino ................. | G01K 1/024 374/142 |
| 2015/0202795 A1 | * | 7/2015 | Mcfarlane ............. | B28C 5/4262 366/54 |
| 2019/0091890 A1 | * | 3/2019 | Rocholl ........... | B01F 29/40111 |
| 2020/0078986 A1 | | 3/2020 | Clifton | |

* cited by examiner

*Primary Examiner* — Anshu Bhatia
(74) *Attorney, Agent, or Firm* — McKee, Voorhees & Sease, PLC

(57) ABSTRACT

A vacuum tank with a rear door, and air and material hoses connectable to the tank door. The tank is rotatable, while the door remains stationary. Liquid, particulate, or slurry material can be vacuumed into the rotating tank, without twisting the hoses. Additional water and/or drying agent can be added to the tank to create a slurry mixture, which can then be discharged from the tank at a convenient dump or work site. The tank may be mounted on a truck, trailer, or frame for transport to a job site and the dump or work site. In an alternative embodiment, the tank may be tilted end-to-end between fill and discharge positions.

21 Claims, 10 Drawing Sheets

ROTATING VACUUM TANK AND METHOD

CROSS-REFERENCE TO RELATED APPLICATIONS

This application is a Continuation-in-Part Application of U.S. Ser. No. 18/581,854, filed Feb. 20, 2024, which is herein incorporated by reference in its entirety.

TECHNICAL FIELD

The invention relates to a rotatable vacuum tank into which liquid or particulate material is vacuumed and mixed with additional particulate or liquid material, respectively, to create a slurry mixture which can be disposed in an environmentally safe manner.

BACKGROUND

Vacuum equipment is used for hydro-excavation, hazardous waste cleanup, and the like. In the industry of underground pipe repair and replacement, contractors often utilize portable vacuum machines to locate existing utilities and prevent damage thereto. Vacuums are also used to remove slurry material in underground horizontal directional drilling projects.

A vacuum hose suctions liquid or particular material into a stationary tank. The material in the tank may be combined with additional solid or liquid materials to create a slurry, and so as to minimize environmental risks upon disposal of the slurry mixture. The tank may be mounted on a truck or trailer for portability. Mixing paddles or augurs may be provided inside the tank to stir and mix the vacuumed materials with the added materials. The truck or trailer with the tank of slurry mixture is then hauled to a dumpsite for discharge. Depending on the location of the project and the type of material being removed, dump sites may be located long distances from the job site and can have expensive dumping fees, both of which add to the cost of the project. Asbestos-containing matter, such as old underground pipe, also must be handled according to governmental regulations to reduce risk to the operators and to the environment.

Therefore, the primary objective of the present invention is the provision of a rotating vacuum tank into which vacuumed liquids and solids are mixed with additional solids or liquids, respectively, to create a neutralized slurry mixture which can then be safely discharged in a convenient location without environmental risks.

Another objective of the present invention is the provision of an improved vacuum tank and vacuum process which minimizes costs.

A further object of the present invention is the provision of a rotating vacuum tank and vacuum process which is safe, efficient, and environmentally responsible for removing and disposing of various materials from project jobsites.

Still another objective of the invention is the provision of a tank for mixing particulate and liquid materials wherein the tank is rotatable about a longitudinal axis and pivot about a lateral axis.

Yet another objective for the invention is the provision of a vacuum tank having material inlet and a material outlet, both on the same end of the tank.

A further objective of the present invention is the provision of a vacuum tank having a vacuum source for introducing materials into the tank and for discharging materials from the tank.

Another objective of the present invention is the provisional of a rotatable vacuum tank having a scale system to weigh materials in the tank.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

SUMMARY

A rotatable vacuum tank is used for removal of waste materials and for mixing raw materials for the production of concrete or similar slurry based products. The tank has front and rear ends. A drive assembly is operably connected to the front end of the tank to rotate the tank. The rear end of the tank includes a door with one or more ports to which hoses are connected to vacuum materials into the tank and to discharge materials from the tank. The door is mounted on a bearing sleeve, such that the door is stationary as the tank rotates, to prevent twisting of the hoses. The swivel connection of the door sleeve is hinged to the tank, such that the door can be moved between opened and closed positions. A vacuum source and a pressure source apply vacuum or pressure, respectively, inside the tank. The vacuumed material may be a liquid or particulate. Water or other liquids may be added to the tank to mix with the vacuumed particulate material to form a slurry mixture. Alternatively, a drying agent or other solids may be added to liquid in the tank to form a slurry mixture. The slurry mixture can then be discharged, without the release or risk of airborne particles, and the discharge material is allowed to harden. The dump or work site for the slurry material may be a field, an empty lot, or back filling excavations at a project site. The tank may be mounted on a truck or trailer for portability. In an alternative embodiment, the tank is mounted on a frame which can be moved by a fork truck or other lift vehicle. The tank may also be pivotal end-to-end about a lateral axis, while the tank is rotated, between a fill position wherein the inlet/outlet end of the tank is raised and a discharge position wherein the inlet/outlet end of the tank is lowered. A scale may be provided to weigh materials inside the tank.

DETAILED DESCRIPTION

Figure 1:
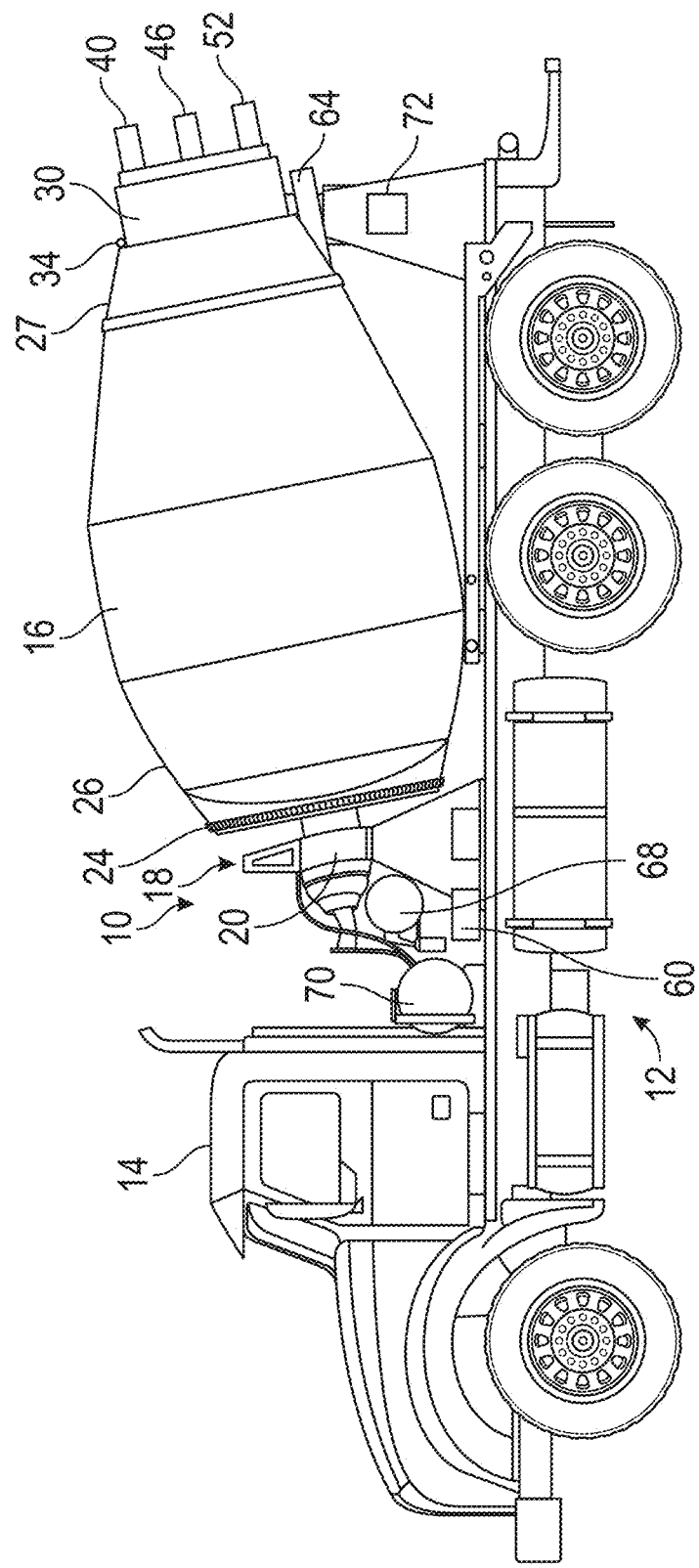
FIG. 1 is a side elevation view of the vacuum tank according to the present invention.

A truck for transporting the rotatable vacuum tank of the present invention is generally designated by the reference numeral 10 in the drawings. The truck 10 includes a chassis 12 and a cab 14, which are conventional. A rotatable tank 16 is mounted on the chassis 12. The truck 10 includes a powered drive assembly 18 to rotate the tank 16. One example of the drive assembly 18 is shown in FIG. 1, wherein a motor 20 has an output shaft operably connected to a sprocket and chain 24 on the front end 26 of the tank 16. Alternatively, the drive assembly 18 may be a hydraulic drive system, an electric motor, a gasoline engine, or a manual drive. As an alternative to the truck 10, the tank 16 may be rotatably mounted on a trailer to be pulled by a truck.

The tank 16 is supported on rollers similar to the tank of a ready-mix cement truck. Unlike a ready-mix tank, the tank 16 includes a door 28 mounted in a sleeve assembly 30 on the rear end 27 of the tank. The sleeve assembly 30 includes an outer sleeve 32 attached to the tank 16 by a hinge 34, such that the door 28 is pivotal about the hinge axis so as to be movable between opened and closed positions. The sleeve assembly 30 also includes an inner sleeve 36 fit within the outer sleeve, with bearings 38 between the outer and inner sleeves 32, 36. The door 28 is fixed to the inner sleeve 36. The bearings 38 allow the outer sleeve 32 to rotate with the tank 16, while the inner sleeve 36 and the door 28 remain stationary.

The door 28 includes a first tube 40 extending through the door having an inner end 42 and an outer end 44. The door 28 includes a second tube 46 extending therethrough, with inner and outer ends 48, 50. A third tube 52 extends to the door 28, and has an inner end 54 and an outer end 56. The tubes 40, 46 and 52 define first, second, and third ports in or through the door 28. An air hose 58 has opposite ends removably connected to the outer end 44 of the first tube 40 and an air source 60, such as a reversible pump, so as to provide positive or negative air pressure inside the tank 16. A material vacuum hose 62 is removably connected to the outer end 50 of the second tube, or to the outer end 56 of the third tube 52. The hoses 58, 62 can be secured to the tubes with any conventional coupler. While the drawings show the tubes 40, 46, 52 to have the same diameters, it is understood that their diameters may vary from one another, with the hoses having diameters to fit the respective tubes.

The tank 16 also has a discharge tube 64 adjacent the rear end 27 of the tank, and apart from the door 28.

The truck 10 or trailer (not shown) includes a supply tank 68 for water or other liquid, and a supply tank 70 for particulate material, such as a drying agent. The liquid supply 68 and the particulate supply 70 have appropriate delivery systems or plumbing for connection to the tank 16, with pumps and shut off valves (not shown) such that the water, liquid, drying agent, or other particulate material may be added to the to the rotating tank 16.

In use, the truck 10 or trailer with the tank 16 is driven to a jobsite wherein material needs to be removed. The material may be a liquid, particulate, or slurry. For example, the tank 16 can be used at a hydro-excavation site, an underground pipe repair or replacement site, a horizontal directional drilling site, or a hazardous material spill site. The air hose 58 is connected to the air source 60 and to the first tube 40. The vacuum hose 62 is connected to the second tube 46. The air source 60 is actuated to provide a vacuum through the hoses 58, 62 such that material at the site can be suctioned into the tank 16, as the tank rotates via the drive assembly 18. If the vacuumed material is liquid, a drying agent or other material from the supply 70 may be added to the tank 16 to create a slurry mixture. If the vacuumed site material is a particulate, water, or other liquid from the supply 68 can be added to the tank 16 to create a slurry mixture. If the vacuumed material at the jobsite is a slurry material, additional liquid, or particulates from the supplies 68, 70 may or may not need to be added to the tank 16. Rotation of the tank 16 mixes the contents to form a slurry material, which can then be discharged at any convenient location.

One option for discharge of the slurry mixture is by connecting the second hose 62 to the third tube 52, closing or shutting the tube 46 via a valve, gate, door, or other closure mechanism on the outer end of the respective tube or on the coupler for the tube and hose, and reversing the air source 60 so as to provide a positive pressure inside the tank 16, thereby forcing the slurry material out the hose 62, as the tank 16 rotates. Alternatively, rotation of the tank 16 can be stopped, the tube 46 is shut or closed, and the hose 62 connected to the fixed discharge tube 64 on the tank to discharge slurry material therethrough. Another option is to disconnect or disable the drive assembly 18, and raise the front end 26 of the tank 16 so as to drain slurry material out of the fixed tube 64, with or without the hose 62 connected thereto. As a further option for cleaning out the tank 16, with the tank rotation stopped, the door 28 can be opened via the hinge 34 for removal of material from the tank. A vibrator, shaker or oscillation motor 72 may be provided on the for the tank 16 to facilitate clean out of slurry material from the tank 16.

It is understood that the size or volume of the tank 16 may vary, depending on the jobsite need. A smaller tank may be hand rotated with a crank or handle. A larger tank will be rotated with a powered drive assembly 18. Also, the door 28 may have additional tubes or ports for coupling additional hoses, beyond that shown in the drawings. For example, preferably the water source 68 and the particulate or drying agent source 70 are connected to the tank 16 through the door 28 so that the additives may be delivered, as needed, through the stationary door as the tank 16 rotates.

Figure 2:
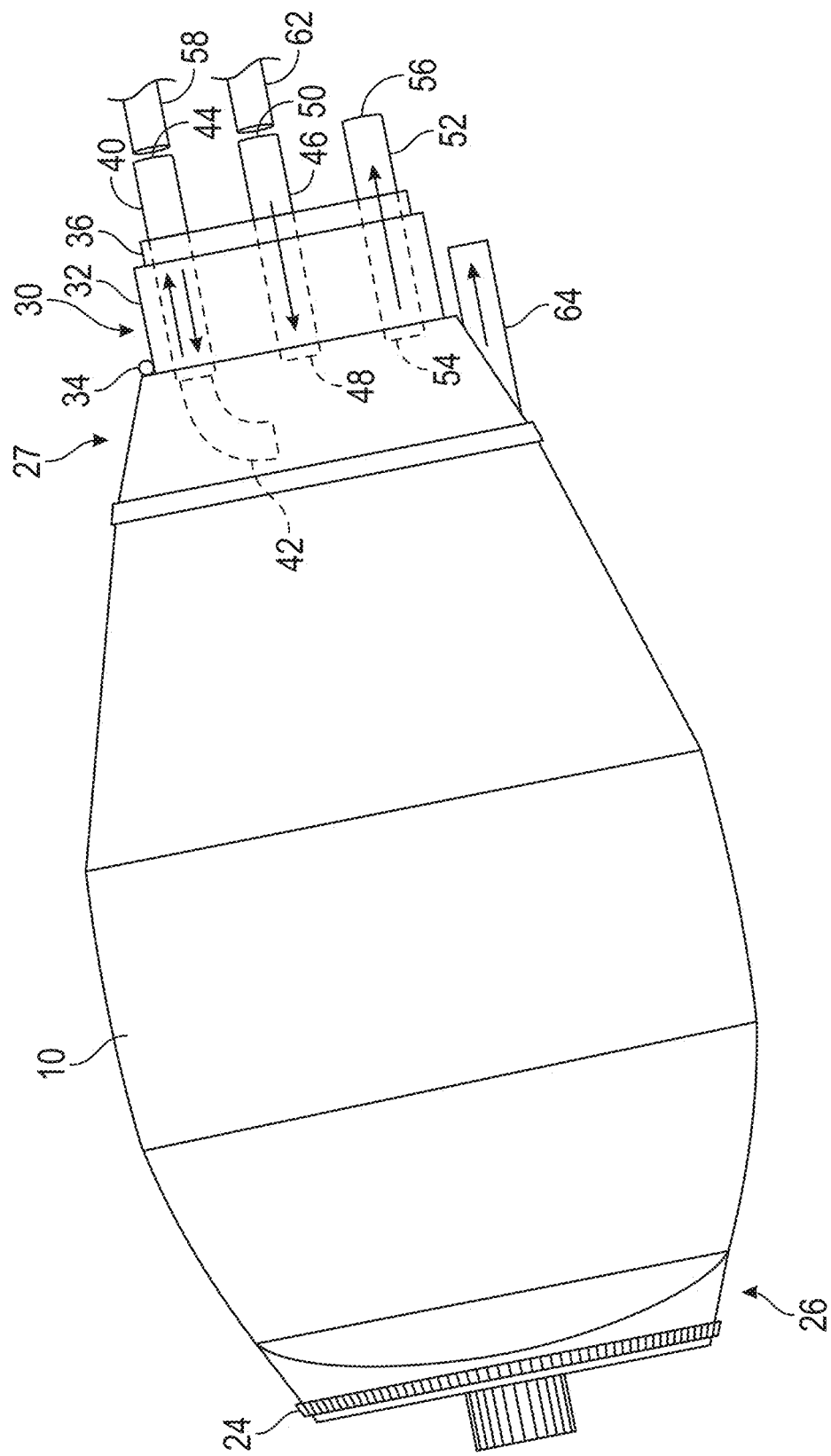
FIG. 2 is a side elevation enlarged view of the rotatable tank shown in FIG. 1.
Figure 3:
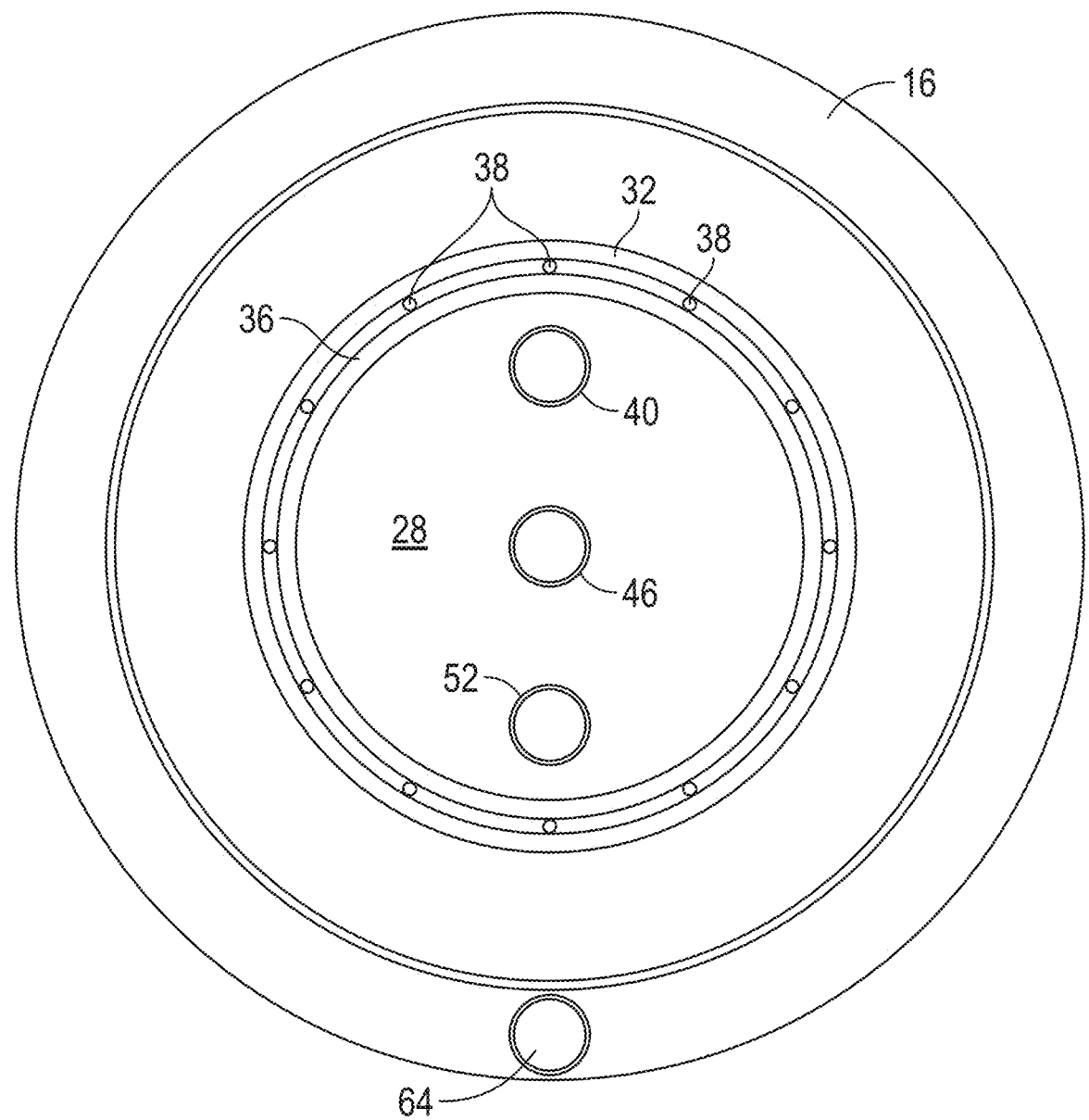
FIG. 3 is a rear end view of the tank door and bearing sleeve.
Figure 4:
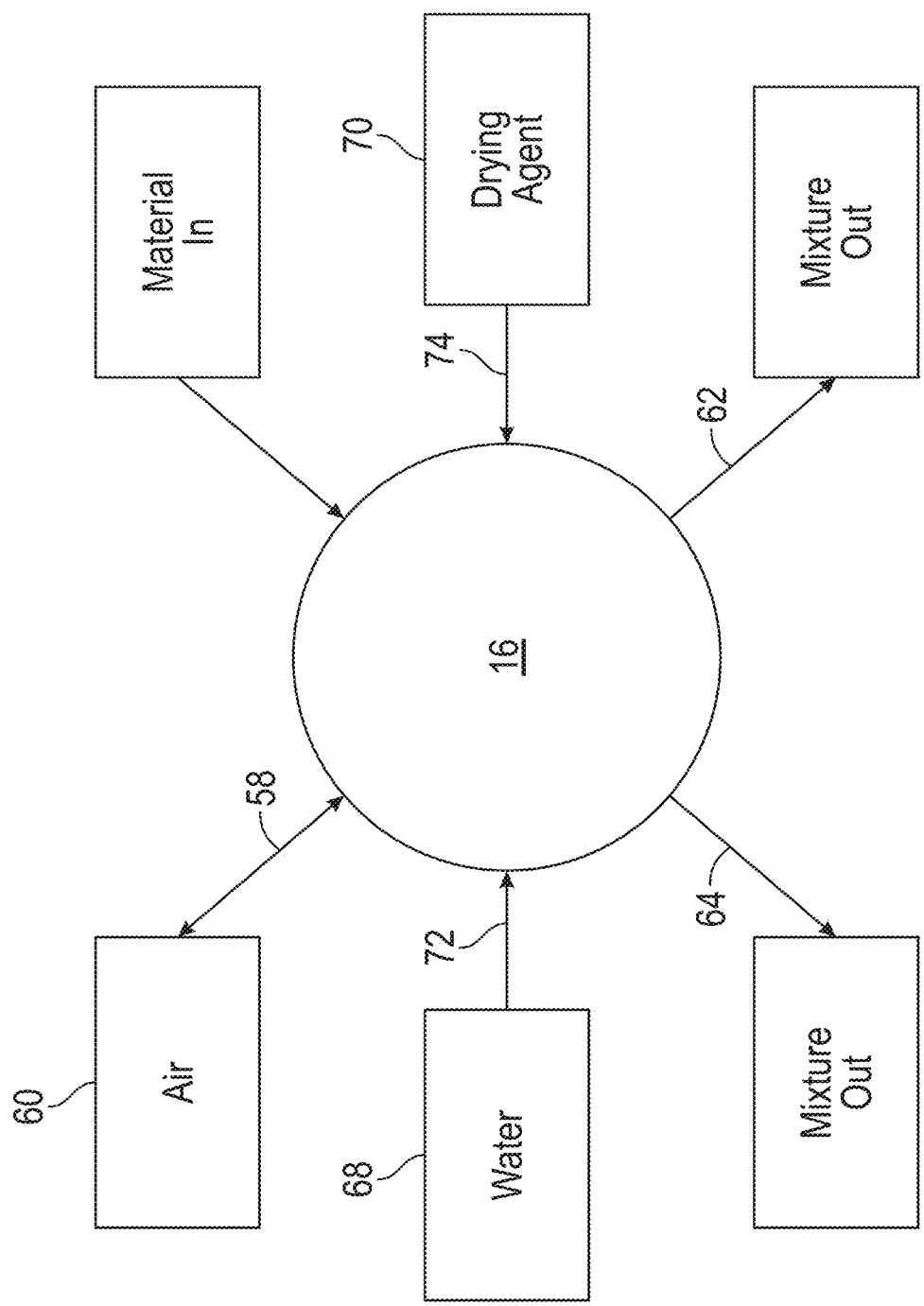
FIG. 4 is a schematic flow chart illustrating the method of the present invention.
Figure 5:
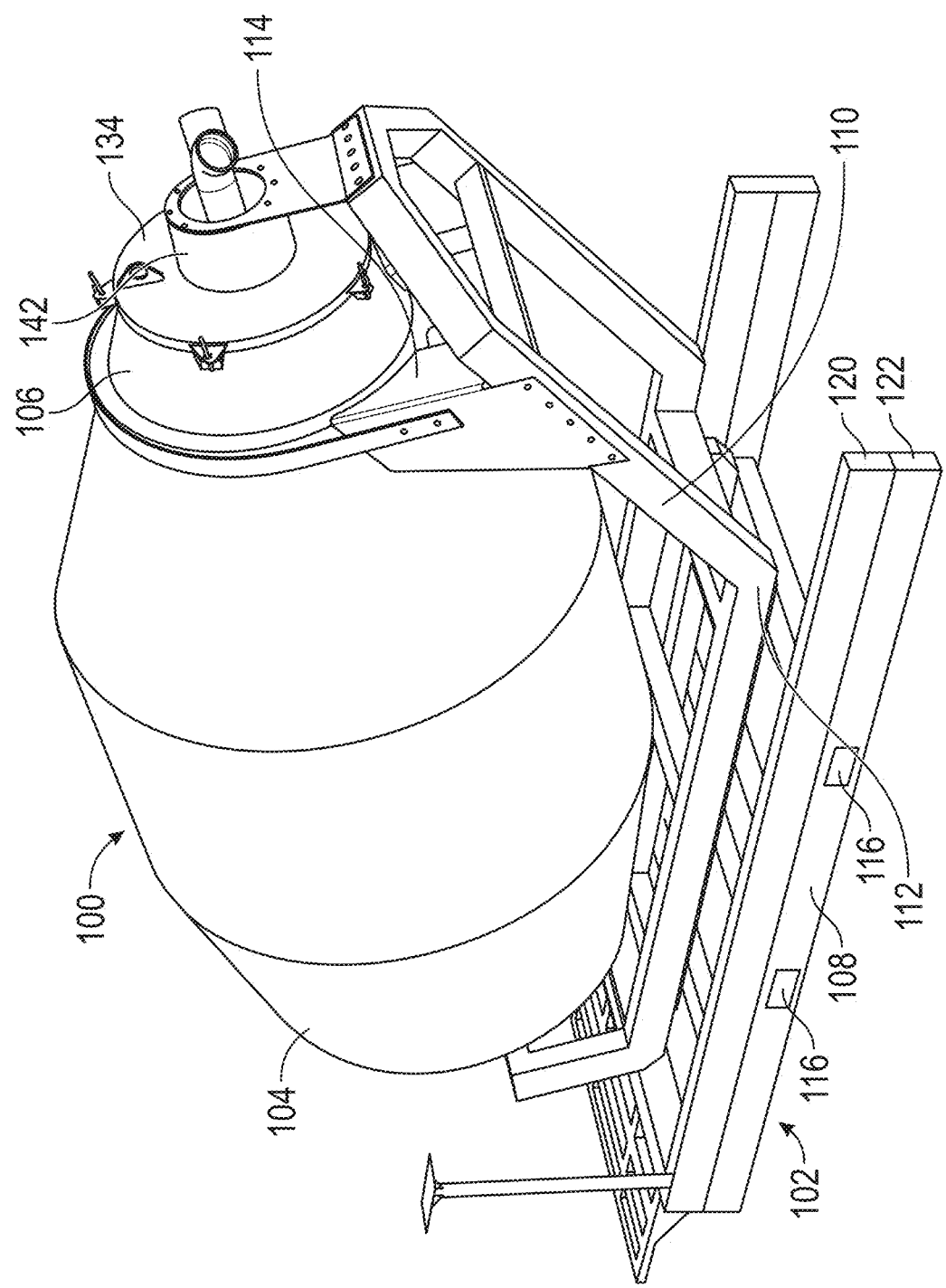
FIG. 5 is a side elevation view of an alternative embodiment of the vacuum tank, with the tank pivoted or tilted to a fill position.
Figure 6:
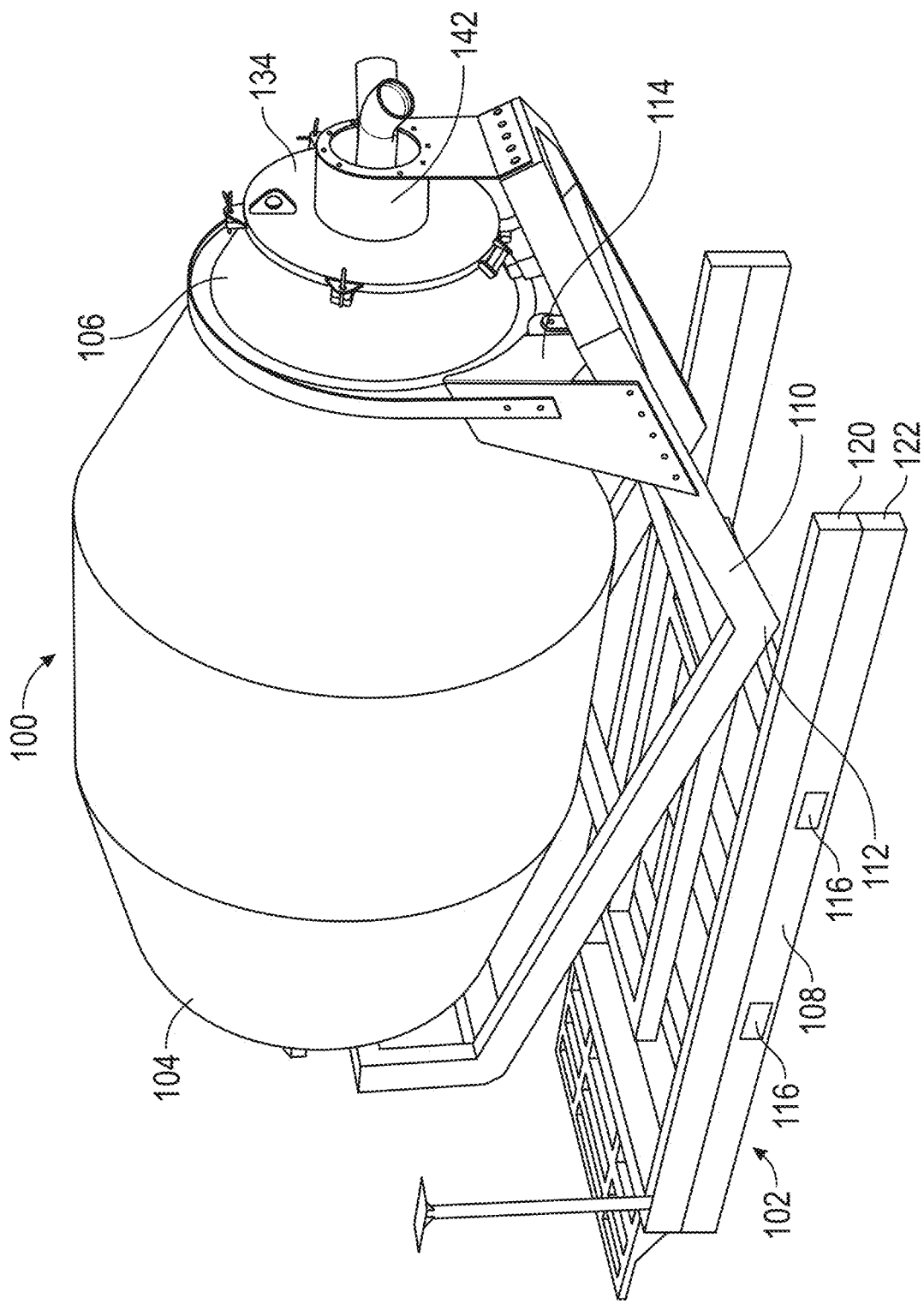
FIG. 6 is a side elevation view of the alternative embodiment tank in a neutral or level position.
Figure 7:
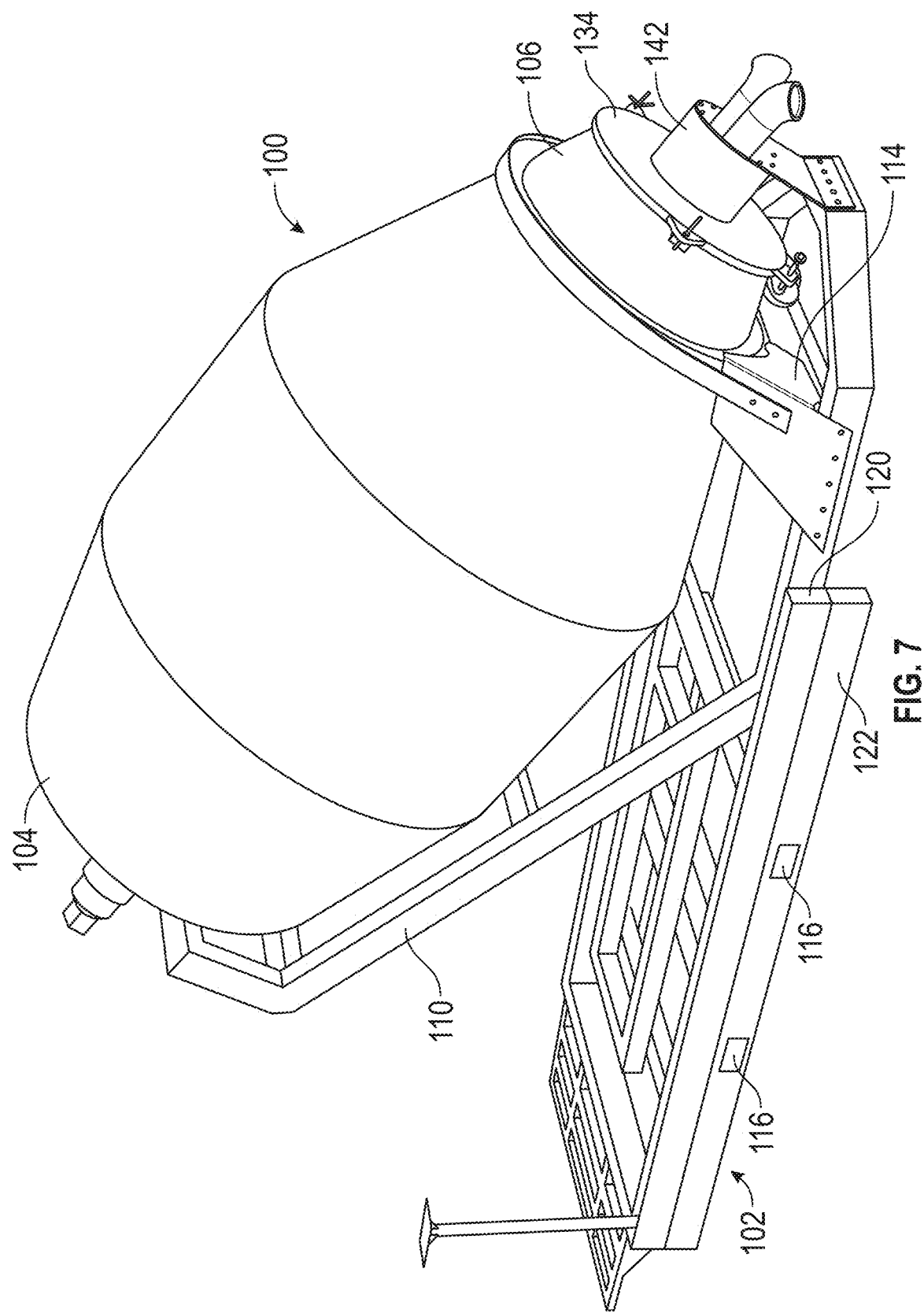
FIG. 7 is a side elevation view of the alternative embodiment tank pivoted or tilted to a discharge position.

FIGS. 5-7 show a second embodiment of the invention, including a tank 100 rotatably mounted on a frame 102. The tank 100 includes a forward end 104 and a rearward end 106. The forward end 104 of the tank 100 has a drive assembly, similar to the drive assembly 18 of the embodiment shown in FIGS. 1 and 2, such that the tank 100 is rotatable about its longitudinal axis. The tank 100 is rotatably supported on rollers (not shown) mounted on the rocker 110 in a roller housing 114 adjacent the rearward end 106 of the tank 100.

The frame 102 includes a base 108 and a rocker 110 pivotally mounted on the base for pivotal movement about a lateral or transverse axis. In a preferred embodiment, the rocker 110 has a V-configuration, including an apex 112 which defines the pivot axis of the rocker 110. The tank 100 is rotatably supported on the rocker 110 and pivots therewith. The pivotal movement of the rocker 110 and the tank 100 is controlled in any convenient manner, such as a linear actuator (not shown) extending between the base 108 and the rocker 110. Thus, the tank 110 can be pivoted or tilted to and from the rearwardly inclined orientation shown in FIG. 5, a horizontal or neutral position shown in FIG. 6, and in a forwardly inclined position shown in FIG. 7. Normally, the position shown in FIG. 5 is used for filling the tank and mixing materials therein, while the position shown in FIG. 7 is used for discharging materials from the tank.

The base 108 of the frame 102 includes fork channels 116 adapted to receive the forks of a fork truck or lift vehicle which can raise and lower the tank and frame assembly 100, 102 and transport the assembly to a desired location.

Figure 9:
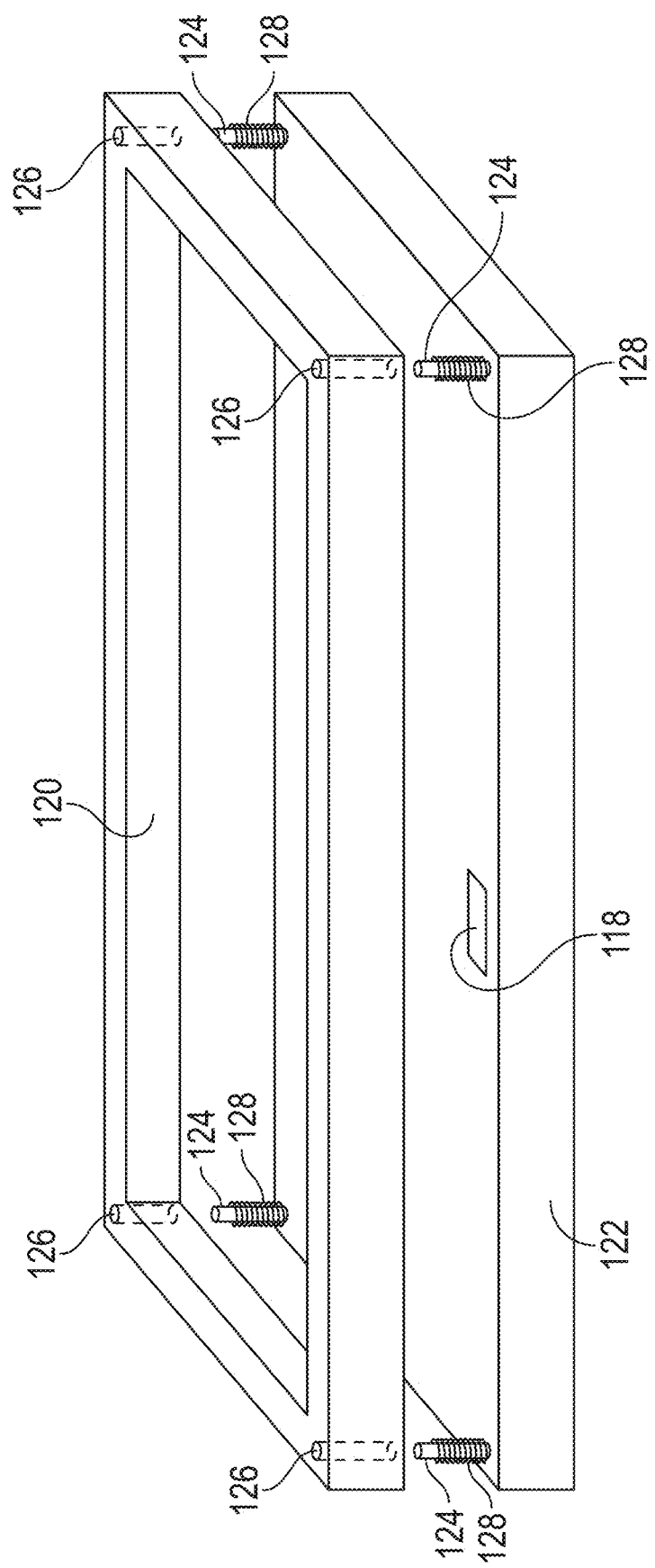
FIG. 9 is an exploded view showing a weigh scale base for weighing the contents of the vacuum tank.

As a further option, the frame 102 may include a weigh scale 118 to weigh the material or contents of the tank 100. In one embodiment shown in FIG. 9, the scale 118 is sandwiched between an upper base member 120 and a lower base member 122. The upper base member 120 is connected and aligned with the lower base member 122 by a series of posts or pins 124 extending upwardly from the lower base member 122 and through aligned holes 126 on the upper base member 120. Load springs 128 extend around each support pin 124, such that the upper frame member 120 floats upwardly and downwardly with respect to the lower base member 122, whereby the weigh scale 118 determines the weight of the material inside the tank 100. Thus, with the scale 118, the weight of materials or ingredients can be precisely measured as the materials or ingredients are added to the tank, so as to prepare various mixtures, according to specific formulations or recipes, such as for concrete, flowable fill, and other products to be used at a work site.

Figure 8:
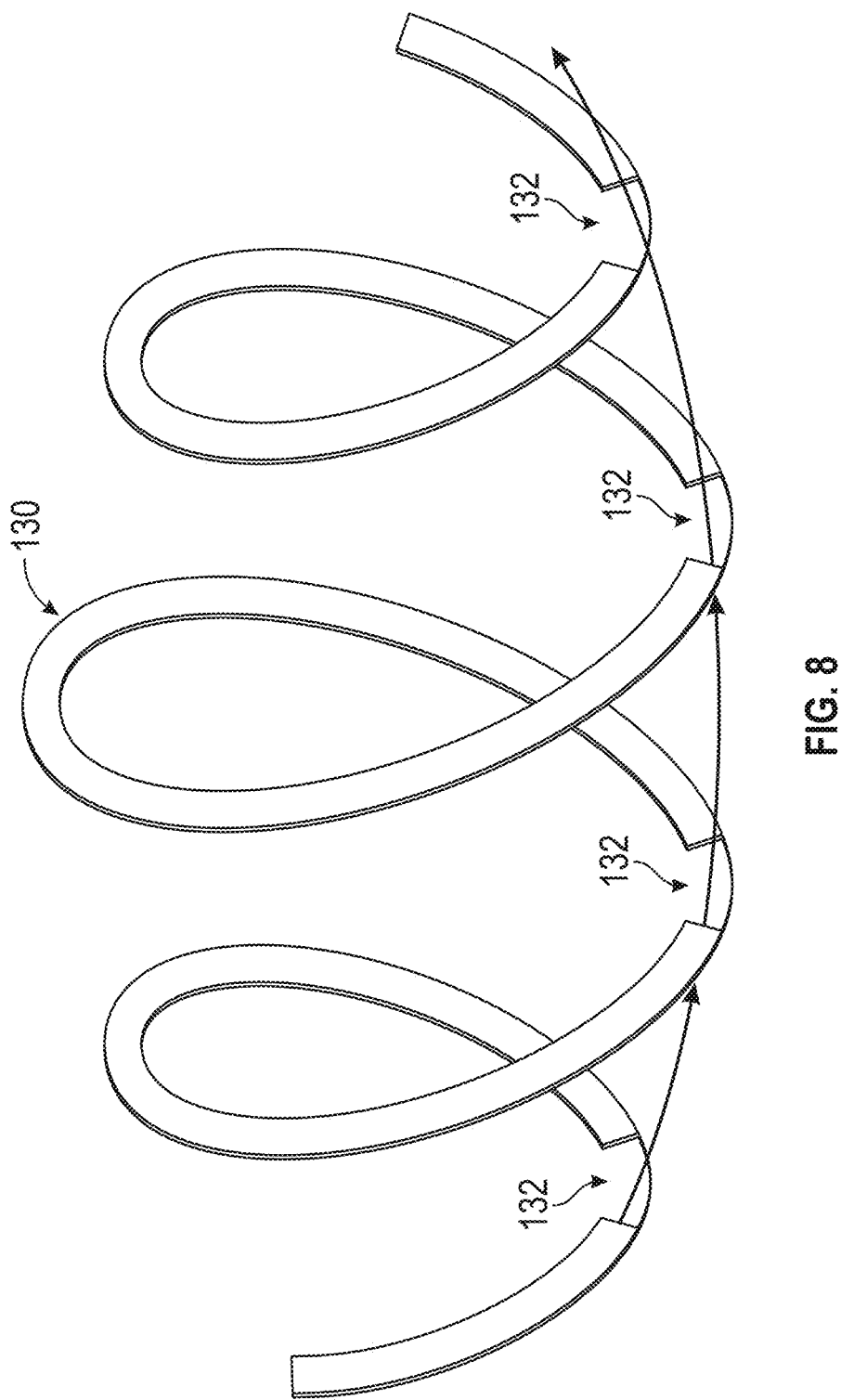
FIG. 8 is a view showing one embodiment of a screw mixer for the inside of the tank.

In a preferred embodiment, a mixing screw 130 is attached to the inside wall of the tank 100. One example of a mixing screw is shown in FIG. 8. The screw 130 is configured to match the interior contour of the tank 100. The screw 130 includes cutouts or openings 132. When the contents of the tank 100 are to be discharged, the tank is rotated to position such that the cutouts 132 reside along the bottom lower most portion of the tank, such that material in the tank can flow through the cutouts for discharge. As an alternative to the cutouts 132, the screw segments can be discontinuous so as to have spaced apart ends defining an opening similar to the cut-out openings 132.

It is contemplated that other mixing means may be used with the screw 130, or in place of the screw 130. For example, mixing paddles can be operatively installed inside the tank to mix the materials therein as the tank 100 rotates.

Figure 10:
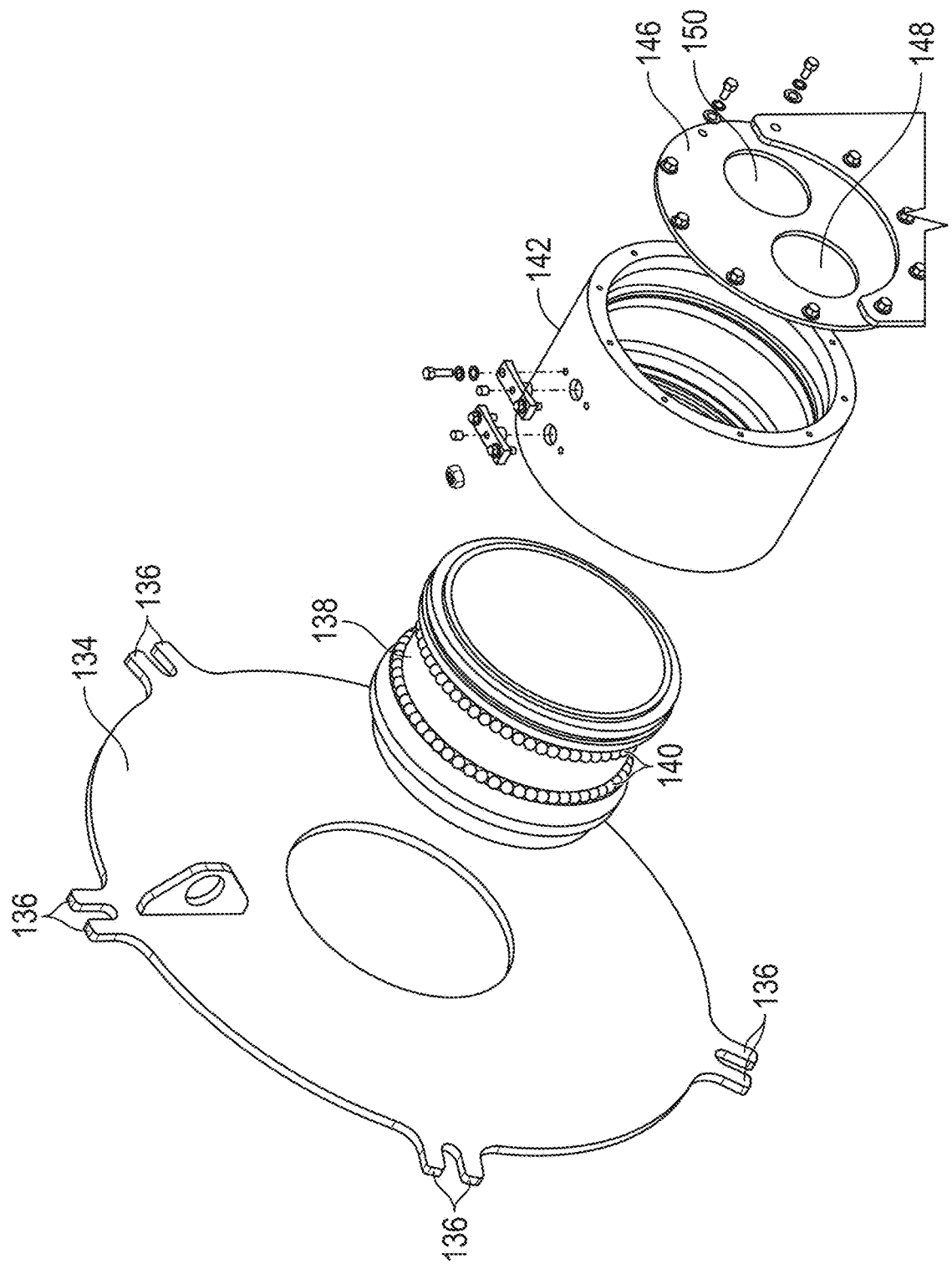
FIG. 10 is an exploded perspective view of one embodiment of inlet/outlet swivel structure for the tank.

The rearward end 106 of the tank 100 includes a door and sleeve assembly, similar to that used for the tank 16, as well as the tubes and hoses on the door 28 of the tank 16. Alternatively, the tank 100 may utilize the door and sleeve assembly shown in FIG. 10. More particularly, a door 134 may be removably mounted to the rear of the tank 100 via spaced apart tabs 136 through which fasteners (not shown), such as nut and bolt connectors extend. An inner sleeve 138 is fixed to the door 134, by welding or any other convenient means. The inner sleeve 138 includes one or more circumferential bearings 140. An outer sleeve 142 extends over the inner sleeve 138 and rides upon the bearings 140. An outer plate 146 is fixed to the rearward end of the outer sleeve 142. The plate 146 includes a first hole 148 and a second hole 150 to which tubes similar to the tubes 40, 46 of the first embodiment extend. Vacuum hoses and a vacuum source are connected to the tubes, similar to the hoses 58, 62 and air source 60 of the first embodiment described above. The door and sleeve assembly 134, 138, 142 allows the tank to function identically as the tank 16, as described above.

Thus, the tank 100 can be used to collect waste material, mix the waste material with environmentally friendly additives, and discharge the mixed slurry at an appropriate site. Also, the tank 100 can be used to mix building materials, such as concrete, in substantially the same manner as waste material is treated in the tank, for use at a work or project site. The concrete components or ingredients can be vacuumed into the tank 100, mixed with water as the tank rotates to create a concrete slurry, and discharge the slurry at the job site.

Thus, the tanks 16 and 100 are portable container assemblies for which can be used to remove waste and/or hazardous materials from a site, treat these materials, transport these materials, and discharge the treated materials at a safe location. The tanks 16, 100 can also be used as container assemblies to mix fresh materials, for example to create concrete and other useful mixtures, transport the mixture, and dispense the mixture at a job site.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A vacuum tank for liquid and particulate materials, comprising:
    a rotatable tank having front and rear ends;
    a drive assembly operably connected to the front end to rotate the tank;
    a door on the rear end;
    ports on the door;
    hoses connected to the ports to vacuum materials into the tank and to discharge materials from the tank; and
    a vibrator connected to the tank to facilitate emptying of material from the tank.

2. The vacuum tank of claim 1 further comprising a frame to support the tank for end-to-end tipping between inclining and declining positions.

3. The vacuum tank of claim 2 wherein the frame includes a base and a rocker assembly to support the tank.

4. The vacuum tank of claim 3, wherein the base includes opposite side rails, and the rocker assembly resides between the side rails.

5. The vacuum assembly of claim 3 wherein the base includes transverse openings adapted to receive forks for raising and lowering the vacuum tank.

6. The vacuum tank of claim 1 further comprising a screw inside the tank to mix the materials as the tank rotates, and the screw having discontinuous inner edge to facilitate discharge of material from the tank.

7. A vacuum tank for liquid and particulate materials, comprising:
    a rotatable tank having front and rear ends;
    a drive assembly operably connected to the front end to rotate the tank;
    a door on the rear end;
    ports on the door;
    hoses connected to the ports to vacuum materials into the tank and to discharge materials from the tank; and
    a frame to support the tank for end-to-end tipping between inclining and declining positions.

8. The vacuum tank of claim 7 further comprising a swivel connection between the door and the tank to allow the tank to rotate without the door rotating.

9. The vacuum tank of claim 7 further comprising a vibrator connected to the tank to facilitate emptying of material from the tank.

10. The vacuum tank of claim 7 further comprising an air source outside the tank to selectively provide positive and negative pressure to the tank.

11. The vacuum assembly of claim 7 further comprising a motor vehicle with a flat bed to support the tank.

12. The vacuum tank of claim 7 further comprising a screw inside the tank to mix the materials as the tank rotates, and the screw having discontinuous inner edge to facilitate discharge of material from the tank.

13. A container assembly for liquid and particular materials, comprising:
a rotatable and pivotal tank;
a material inlet and a material outlet on one end of the tank;
wherein the tank is pivoted in one direction to receive the materials via the inlet and pivoted in an opposite direction to discharge the materials,
a frame to support the tank for rotation about a longitudinal axis and pivoting about a lateral axis; and
a weigh scale on the frame to weigh the tank.

14. The container assembly of claim 13 further comprising a vacuum source to vacuum materials into the tank.

15. The container assembly of claim 13 wherein the vacuum source is reversed to remove materials from the tank.

16. The container assembly of claim 13 further comprising the scale weighs materials added to the tank to produce precise mixtures.

17. The container assembly of claim 13 wherein the tank is mounted on a truck.

18. The container assembly of claim 13 further comprising a screw inside the tank to mix the materials as the tank rotates, and the screw having a discontinuous inner edge to facilitate discharge of material from the tank.

19. A vacuum tank for liquid and particulate materials, comprising:
a rotatable tank having front and rear ends;
a drive assembly operably connected to the front end to rotate the tank;
a door on the rear end;
ports on the door;
hoses connected to the ports to vacuum materials into the tank and to discharge materials from the tank; and
a swivel connection between the door and the tank to allow the tank to rotate without the door rotating.

20. The vacuum tank of claim 19 further comprising a screw inside the tank to mix the materials as the tank rotates, and the screw having discontinuous inner edge to facilitate discharge of material from the tank.

21. The vacuum tank of claim 19 further comprising a frame to support the tank for end-to-end tipping between inclining and declining positions.

\* \* \* \* \*